United States Patent
Desbiendras et al.

(10) Patent No.: US 6,212,911 B1
(45) Date of Patent: Apr. 10, 2001

(54) MOULD WITH PIVOTING DRAWER

(75) Inventors: Philippe Desbiendras, Le Treport; Remy Badin, Criel, both of (FR)

(73) Assignee: Saint-Gobain Emballage, Courbevoie (FR)

( * ) Notice: Subject to any disclaimer, the term of this patent is extended or adjusted under 35 U.S.C. 154(b) by 0 days.

(21) Appl. No.: 09/147,814

(22) PCT Filed: Jul. 9, 1998

(86) PCT No.: PCT/FR98/01485

§ 371 Date: Apr. 30, 1999

§ 102(e) Date: Apr. 30, 1999

(87) PCT Pub. No.: WO99/03788

PCT Pub. Date: Jan. 28, 1999

(30) Foreign Application Priority Data

Jul. 15, 1997 (FR) ................................................ 97 08935

(51) Int. Cl.[7] ........................................................ C03B 11/06
(52) U.S. Cl. ................... 65/227; 65/303; 65/357; 65/360; 425/442; 249/170; 249/171
(58) Field of Search ............................... 65/303, 357, 360, 65/227; 425/442; 249/170, 171

(56) References Cited

U.S. PATENT DOCUMENTS

| | | | |
|---|---|---|---|
| 1,163,135 | * | 12/1915 | Friese et al. . |
| 1,404,310 | * | 1/1922 | Miller . |
| 1,948,146 | * | 2/1934 | Warren . |
| 3,268,322 | * | 8/1966 | Denmen . |
| 5,019,147 | * | 5/1991 | Voisine et al. . |

FOREIGN PATENT DOCUMENTS

| | | | |
|---|---|---|---|
| 11728 | * | 6/1956 | (DD) . |
| 232286 | * | 3/1911 | (DE) . |
| 437403 | * | 11/1926 | (DE) . |
| 541865 | * | 1/1932 | (DE) . |
| 586683 | * | 10/1933 | (DE) . |
| 1483780 | * | 9/1967 | (FR) . |
| 639323 | * | 7/1950 | (GB) . |
| 9205027 | * | 4/1992 | (WO) . |

* cited by examiner

Primary Examiner—Stanley S. Silverman
Assistant Examiner—Michael P. Colaianni
(74) Attorney, Agent, or Firm—Oblon, Spivak, McClelland, Maier & Neustadt, P.C.

(57) ABSTRACT

A mold having a pivoting slide. The mold is made of two shells. An element is rotationally mounted on one of the shells with a part of the element coinciding with the internal cavity of the mold. The element is closed by the second shell which has bearing surface which acts on the element. The mold may be used for glassware products.

20 Claims, 3 Drawing Sheets

MOULD WITH PIVOTING DRAWER

BACKGROUND OF THE INVENTION

1. Field of the Invention

The present invention relates to a mold in which an organic or mineral material is shaped by application of known techniques such as blowing, pressing or reactive injection, the mold being cold or alternatively equipped with a heating means as the case may be. Different techniques among those cited hereinabove are frequently used in combination.

2. Discussion of the Background

The problem that in particular motivated the in-depth studies carried out by the inventors is that of release from the mold, in the case of articles with special shapes comprising square or rectangular cross sections or more complex geometries. In fact, when an article with rectangular cross section is produced in a classical two-jaw mold with a mold joint plane cutting, for example, the rectangular cross section of the internal mold cavity into two equal parts parallel to two sides of the rectangle, the normal method of release from the mold by opening the mold by rotation of the jaws around an axis perpendicular to the said section and included in the joint plane is precluded: such release from the mold would cause the molded substance to be gripped by the material constituting the walls of the internal cavity, in the zone of the two apices of the rectangular section most distant from the axis of rotation.

Several known solutions to this problem have been proposed.

According to a first method, the cavity is offset at an angle in the mold such that, for example, the joint plane cuts the rectangular cross section of this cavity along one of its diagonals. Release from the mold by rotation of the jaws in the manner described hereinabove is then made possible. This solution is not satisfactory, however, for certain types of manufacturing. Thus the manufacture of hollow glassware products is frequently carried out in two main stages by means of I.S. (Individual Section) machines. During the first stage, the parison or glass glob is introduced into a preforming mold, the base of which is extended by a ring mold used for final shaping of the open upper part of the manufactured product.

The ring mold also has the function of gripping the preform in a subsequent operation in which the said preform is turned upside down prior to the second stage, in which the preforming mold is replaced by a finishing mold in which the hollow product is shaped by blowing.

Of course, the positioning of the preform in the preforming mold and thus the shape thereof must be adapted to correspond to the positioning of the internal cavity in the finishing mold. Despite such adaptation, when the said cavity is provided with the angular offset described hereinabove, homogeneous distribution of the glass in the cavity cannot be achieved. In fact, the zones of the parison close to the short sides of the rectangle are hotter than those close to the long sides, because they are surrounded by a smaller quantity of the material which constitutes the mold and which can remove heat from the glass. In addition, regular movement of glass close to the corners is impaired. Under these conditions, the specialists have observed that introduction of the preform into the finishing mold provided with an angular offset made it more difficult to obtain products with the desired symmetric shapes; instead, flattened zones or other distortions in relation to these shapes can be observed, especially at the corners. In certain cases, it may prove necessary to introduce into the finishing mold a more built-up preform, meaning one whose shape is closer to the final shape.

Furthermore, because of the inhomogeneity of temperatures and of distribution of the mass of the glass, it is almost impossible to make the lines corresponding to the joint plane of the preforming mold and of the finishing mold coincide on the product. On the contrary, the formation of two different lines for a given mold configuration cannot be prevented in controlled and reproducible manner; the appearance of the resulting product is affected thereby.

A variant of the first method comprising angular offset of the cavity as described herein is known by the name of "mold with broken joint plane". The disadvantages related to inhomogeneity of the glass mass are not eliminated with this variant. Moreover, this type ofjoint plane leaves larger marks on the finished product, for reasons that are not very clear at the present time; furthermore, molds of this type wear out particularly quickly.

According to a second method, attempts have therefore been made to dispense with angular offset of the cavity, which is blamed for production of dissymmetries on certain products obtained, while preventing the molded substance from being gripped by the mold at the moment of release from the mold, especially in the corners, as indicated hereinabove. To achieve this, the portion of the mold representing the cavity face most distant from the axis of opening of the mold could be made translationally movable. In such a configuration, however, it appeared difficult to avoid complex and cumbersome peripheral mechanisms, which would be subject to large torsional stresses and finally to rapid wear and excessively difficult disassembly and/or cleaning.

Consequently, the inventors achieved the present invention, which has as its object a mold with at least two jaws. More particularly, the invention is characterized by at least one element which can move rotationally relative to a first jaw, and by the fact that a portion of the surface of the said pivoting element constitutes a portion of the internal cavity of the mold when the mold is in closed position.

At the moment of release from the mold, therefore, the wall of the internal cavity which tends to grip the corners of the molded product is stripped progressively so that such gripping can no longer occur. Secondly, an arrangement of the internal cavity which is symmetric relative to the general shape of the mold and to its joint plane is not incompatible with the invention; the risk of formation of undesired dissymmetries is therefore minimal.

Preferably the mold comprises a means for closing the pivoting element of the invention, this closing means being provided with a bearing surface which acts on the pivoting element during closing of the mold. This bearing surface may belong to a part external to the mold jaws. However, it belongs advantageously to a second jaw itself or to another similar pivoting element mounted to move rotationally on such a second jaw.

As for the opening means, in relation to the first jaw, of said pivoting element which is mounted thereon, it preferentially applies a restoring force on said pivoting element. It is this restoring force which guarantees that the element will make contact with the said bearing surface of the aforesaid closing means during the terminal phase of closing of the mold and the initial phase of opening thereof. Of course, the restoring force is applied on a face of the pivoting element other than that capable of making contact with the closing means, opening and closing of the pivoting element corresponding to the two opposite directions of its freedom of rotation relative to the said first jaw. The means for application of the restoring force may be external to the mold jaws or alternatively may be installed in the said first jaw.

The pivoting element of the invention may also be translationally movable, especially in a direction substantially perpendicular to the portion or the wall of the internal cavity of the mold constituted by the said element. This variant makes it possible to achieve greater clearance of the element during release from the mold; in certain embodiments, however, it is appropriate to ensure that this advantage is greater than the aforesaid disadvantage of cumbersome, complex peripheral mechanisms subject to large mechanical stresses.

According to a particularly advantageous embodiment, the mold comprises two elements mounted on two different jaws which, in closed position of the mold, are joined to form a portion of the internal cavity free of visible discontinuity from one element to the other, except for the relatively thin mark of the lateral joint plane which they define. This variant is particularly effective when the portion in question of the internal cavity is a complex or faceted surface or a rounded surface bearing relief patterns which constitute just as many causes for gripping between the mold and the molded product during release from the mold.

According to the invention, each jaw is preferably provided with 0, 1 or 2 pivoting elements. In the case of a two-jaw mold, the mounting of a single element on one side of a single jaw will already achieve the expected result in the majority of cases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

This corresponds to the situation of the embodiment described previously, designed specially for complex molded surfaces.

As explained hereinabove, the mold of the invention is particularly well adapted to the manufacture of glassware products, especially of hollow type such as bottles and flasks, and is particularly useful in the case of complex molded shapes. This mold is advantageously a finishing mold for an I.S. machine.

It will now be described with reference to the attached figure, which is a schematic representation of a half-mold according to the invention, viewed in section in closed position.

Figure 1:
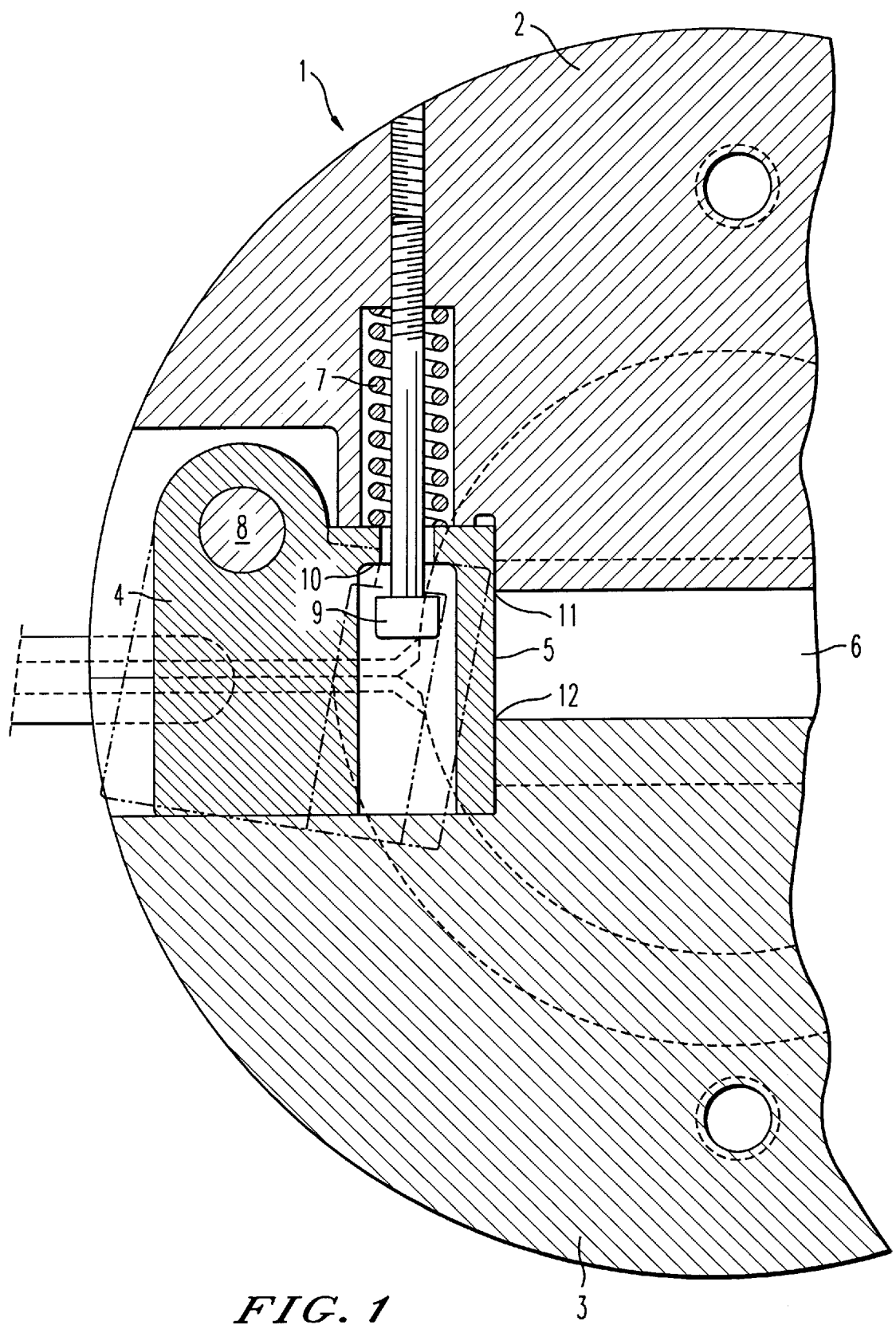
FIG. 1 illustrates a half-mold according to a first embodiment of the present invention.

FIG. 1 depicts a mold 1 including two substantially semicylindrical jaws 2 and 3. An element 4 is mounted to move rotationally around axis 8 on jaw 2. A recess partly in jaw 2 and partly in jaw 3 was provided to accommodate element 4.

Internal cavity 6 of mold 1 is defined by the walls of jaws 2 and 3 and wall 5 of element 4.

The latter is provided with a vertical recess which traverses it from one side to another and the upper part of which is narrower and forms a stop 10. The shank of a bolt 9 is introduced from underneath into this recess and traverses the upper part 10 thereof; because the head of bolt 9 has a larger diameter, it in turn would be retained by stop 10, which limits the upward travel of bolt 9.

Bolt 9 is screwed at an adjustable height into jaw 2, in which there is installed a spring 7 around the shank of bolt 9. The upper end of spring 7 is stopped against a portion of jaw 2 having appropriate shape; the lower end of the spring applies a certain restoring force on the upper face of element 4.

During opening of the mold, this force causes element 4 to pivot to a position such as represented by broken lines. This position is achieved progressively as jaws 2 and 3 move apart from each other, the lower face of element 4 being stopped against jaw 3. The shank of bolt 9 passes with a certain clearance through the upper portion of the bore provided in element 4. Pivoting of element 4 is limited to the position in which the head of bolt 9 comes into contact with stop 10.

During closing of the mold, element 4 executes inverse pivoting under the effect of the force exerted by jaw 3 on the lower face of element 4, until face 5 of element 4 blocks off internal cavity 6.

The marks of the joint plane of the illustrated mold coincide advantageously with the edges of the flask corresponding to the corners 11, 12 thereof.

In view of the foregoing description of the operation of opening of the mold, it is clear that any risk of gripping of molded substance by the walls of the mold during release from the mold is eliminated, including gripping in the vicinity of the most critical corner 11.

In the mold illustrated in the figure, which mold is perfectly adapted to use as a finishing mold in the manufacture of hollow glassware products, the preform can be positioned in the internal cavity such that it is symmetric relative to the general geometry of the mold and to its joint plane. The glass can then be cooled homogeneously and symmetrically by the surrounding material of the mold; as a result, there is achieved homogeneous and symmetric distribution of temperatures in the body of the glass and of the glass itself in the internal cavity.

Figure 2:
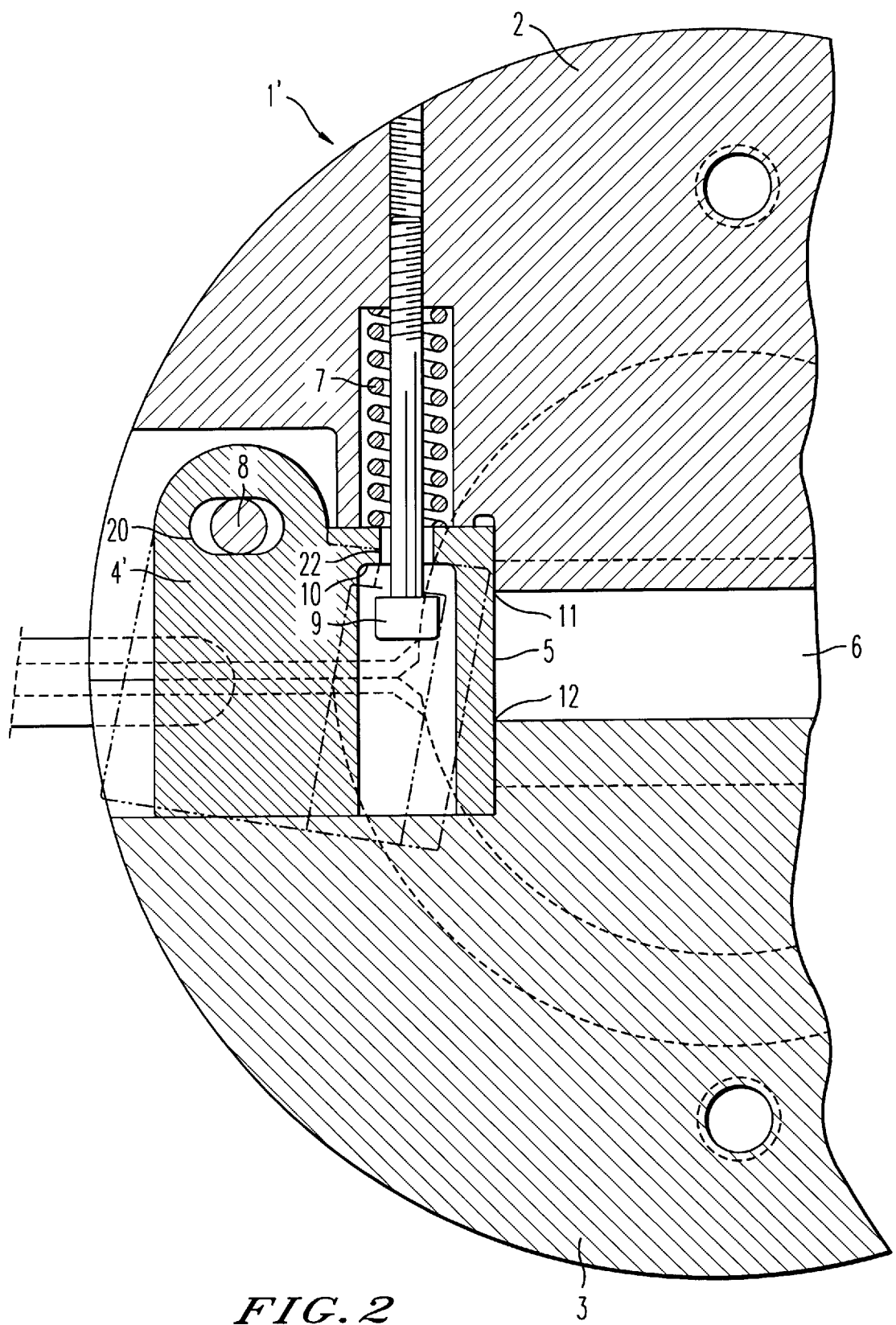
FIG. 2 illustrates a half-mold according to a second embodiment of the present invention.

FIG. 2 depicts a second embodiment where mold 1' includes an element 4' that is translationally movable. The element 4' is translationally movable in a direction substantially perpendicular to the portion of the wall of the internal cavity constituted by the element 4'. In the second embodiment the element 4' includes an elongated slot 20 that provides for the translational movement of the element 4' on axis 8. The element 4' also includes a slot 22 to allow the element 4' to translate with respect to the bolt 9.

Figure 3:
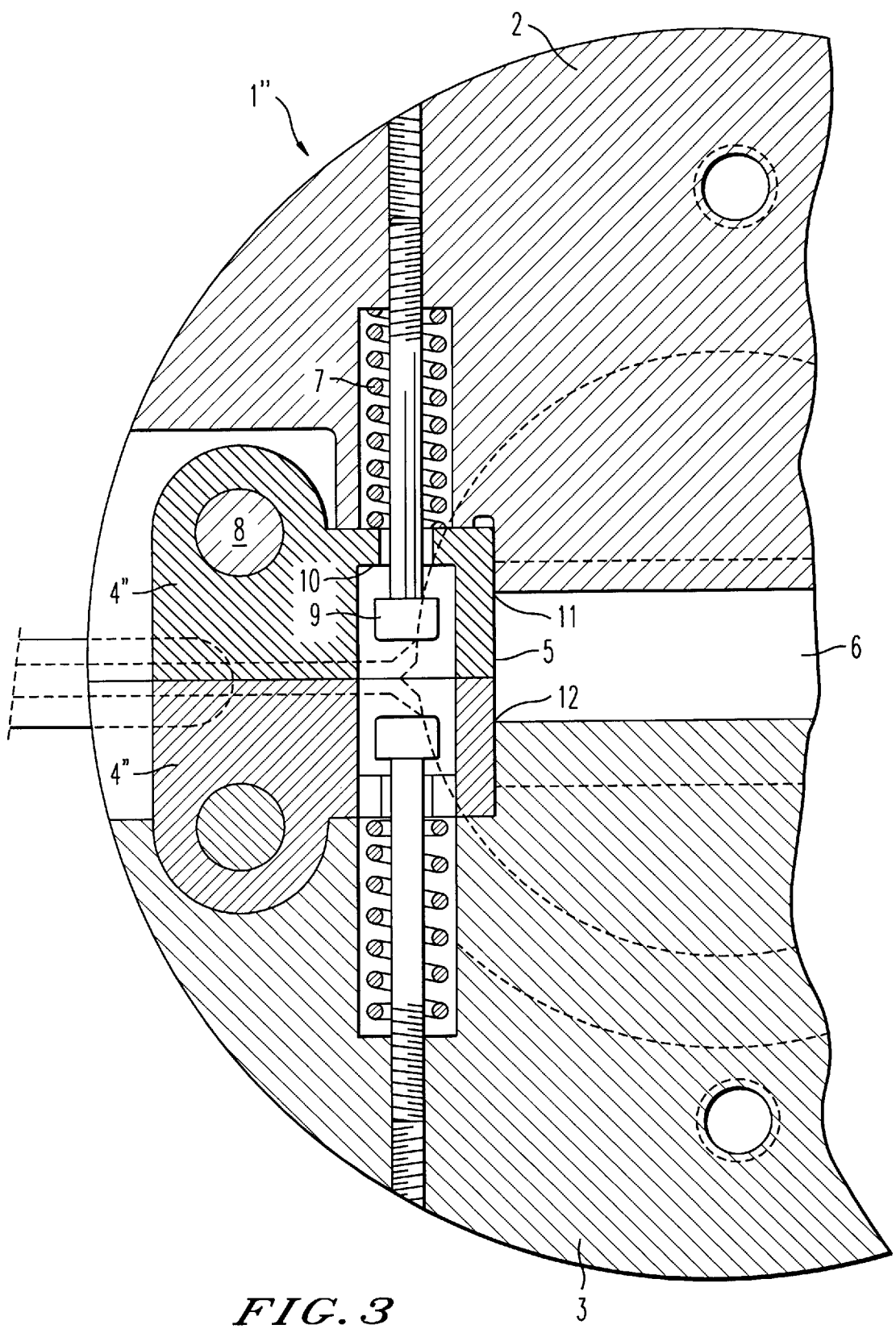
FIG. 3 illustrates a half-mold according to a third embodiment of the present invention.

FIG. 3 depicts a third embodiment where a mold 1 " includes two elements 4" mounted on different jaws, namely jaw 2 and jaw 3. In the third embodiment the elements 4" both include a portion that constitutes a portion of the internal cavity.

Release from the mold and maintenance of the mold of the invention are simplified.

By virtue of the small space requirement of the mechanism constituted by the pivoting element, it becomes possible to envision working with multiple parisons and not necessarily with single parisons as at present, or in other words manufacturing two flasks or four flasks, for example, per mold.

What is claimed is:

1. A mold comprising at least two jaws pivotally connected to each other, wherein at least one element is rotationally mounted to a first jaw of the at least two jaws, and wherein, in a closed position of the mold, a portion of a surface of the at least one element coincides with a portion of an internal cavity of the mold.

2. A mold according to claim 1, further comprising a means for closing the at least one element, the closing means being provided with a bearing surface which acts on the at least one element during closing of the mold.

3. A mold according to claim 2, wherein said closing means comprises a second jaw or a second element mounted on a second jaw.

4. A mold according to claim 1, further comprising a means for opening the at least one element, the opening means being configured to apply a restoring force to the at least one element.

5. A mold according to claim 1, wherein the at least one element is translationally movable.

6. A mold according to claim 1, wherein a direction of translation is substantially perpendicular to the portion of the internal cavity of the mold defined by the at least one element.

7. A mold according to claim 1, wherein the at least two jaws include the first jaw and a second jaw, and wherein the at least one element includes a first element and a second element mounted on the first jaw and the second jaw, respectively, the first element and the second element each define a portion of the internal cavity of the mold according to a surface which does not exhibit any discontinuity from the first element and the second element.

8. A mold according to claim 1, wherein each jaw of the at least two jaws carries one or two elements which are rotationally movable.

9. A mold according to claim 1, intended for the manufacture of glassware products.

10. A mold according to claim 9, comprising a finishing mold intended for the manufacture of hollow glassware products.

11. A mold according to claim 2, further comprising a means for opening the at least one element, the opening means being configured to apply a restoring force to the at least one element.

12. A mold according to claim 3, further comprising a means for opening the at least one element, the opening means being configured to apply a restoring force to the at least one element.

13. A mold according to claim 2, wherein the at least one element is translationally movable.

14. A mold according to claim 3, wherein the at least one element is translationally movable.

15. A mold according to claim 4, wherein the at least one element is translationally movable.

16. A mold according to claim 2, wherein the at least two jaws include the first jaw and a second jaw, and wherein the at least one element includes a first element and a second element mounted on the first jaw and the second jaw, respectively, the first element and the second element each define a portion of the internal cavity of the mold according to a surface which does not exhibit any discontinuity from the first element and the second element.

17. A mold according to claim 3, wherein the at least two jaws include the first jaw and the second jaw, and wherein the at least one element includes a first element and the second element mounted on the first jaw and the second jaw, respectively, the first element and the second element each define a portion of the internal cavity of the mold according to a surface which does not exhibit any discontinuity from the first element and the second element.

18. A mold according to claim 4, wherein the at least two jaws include the first jaw and a second jaw, and wherein the at least one element includes a first element and a second element mounted on the first jaw and the second jaw, respectively, the first element and the second element each define a portion of the internal cavity of the mold according to a surface which does not exhibit any discontinuity from the first element and the second element.

19. A mold according to claim 5, wherein the at least two jaws include the first jaw and a second jaw, and wherein the at least one element includes a first element and a second element mounted on the first jaw and the second jaw, respectively, the first element and the second element each define a portion of the internal cavity of the mold according to a surface which does not exhibit any discontinuity from the first element and the second element.

20. A mold according to claim 6, wherein the at least two jaws include the first jaw and a second jaw, and wherein the at least one element includes a first element and a second element mounted on the first jaw and the second jaw, respectively, the first element and the second element each define a portion of the internal cavity of the mold according to a surface which does not exhibit any discontinuity from the first element and the second element.

* * * * *